(12) United States Patent
    Kilroy et al.

(10) Patent No.: US 11,399,025 B2
(45) Date of Patent: Jul. 26, 2022

(54) ROLE-TEMPLATE-BASED BATCH MANAGEMENT OF TENANT-SPECIFIC ROLES AND RIGHTS IN A COMPUTING SYSTEM

(71) Applicant: VMware, Inc., Palo Alto, CA (US)

(72) Inventors: John Kilroy, Portsmouth, NH (US); Bradley R. Neighbors, Wellesley, MA (US); Stephen Evanchik, Danvers, MA (US)

(73) Assignee: VMware, Inc., Palo Alto, CA (US)

( * ) Notice: Subject to any disclaimer, the term of this patent is extended or adjusted under 35 U.S.C. 154(b) by 574 days.

(21) Appl. No.: 15/880,786

(22) Filed: Jan. 26, 2018

(65) Prior Publication Data
    US 2019/0238542 A1    Aug. 1, 2019

(51) Int. Cl.
    *H04L 29/00*    (2006.01)
    *H04L 9/40*    (2022.01)
    *G06F 9/455*    (2018.01)
    *H04L 67/10*    (2022.01)
    *H04W 12/00*    (2021.01)

(52) U.S. Cl.
    CPC .......... *H04L 63/10* (2013.01); *G06F 9/45541* (2013.01); *H04L 67/10* (2013.01); *H04W 12/009* (2019.01); *H04L 63/104* (2013.01)

(58) Field of Classification Search
    CPC .... H04L 63/10; H04W 12/009; G06F 9/45541
    USPC .............................................................. 726/4
    See application file for complete search history.

(56) References Cited

U.S. PATENT DOCUMENTS

| | | | |
|---|---|---|---|
| 9,251,241 B2 * | 2/2016 | Howarth | G06Q 10/103 |
| 10,235,439 B2 * | 3/2019 | Sullivan | G06F 16/254 |
| 2015/0025960 A1 * | 1/2015 | Gadamsetty | G06F 3/0482 705/14.44 |

* cited by examiner

*Primary Examiner* — Jeffrey C Pwu
*Assistant Examiner* — Michael D Anderson
(74) *Attorney, Agent, or Firm* — Patterson + Sheridan, LLP

(57) ABSTRACT

An example method of managing rights in a cloud computing system includes: creating a role template having a role template set of rights to resources in the cloud computing system; assigning a tenant set of rights to the resources to each of a plurality of tenants of the cloud computing system, respectively; and creating a role instance for each respective tenant based on the role template and assigning the role instance to each respective tenant, where the role instance is linked to the role template in the cloud computing system and where the role instance includes a role instance set of rights that includes an intersection of the role template set of rights and the tenant set of rights for the respective tenant.

20 Claims, 4 Drawing Sheets

ROLE-TEMPLATE-BASED BATCH MANAGEMENT OF TENANT-SPECIFIC ROLES AND RIGHTS IN A COMPUTING SYSTEM

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

A hybrid cloud system aggregates the resource capabilities from both private and public clouds. A private cloud can include one or more customer data centers (referred to herein as "on-premise data centers"). The public cloud can include a multi-tenant cloud architecture providing IaaS cloud services. In a hybrid cloud system, it is desirable to support VM migration between the data center and the public cloud. Presently, to implement VM migration, a customer must first create a VM from scratch within the public cloud and then transfer data from a powered-off source VM in the on-premise data center to the newly created VM in the public cloud. This process has the disadvantage of significant downtime for the VM being migrated.

SUMMARY

In an embodiment, a method of managing rights in a cloud computing system includes: creating a role template having a role template set of rights to resources in the cloud computing system; assigning a tenant set of rights to the resources to each of a plurality of tenants of the cloud computing system; and creating a role instance for each respective tenant based on the role template and assigning the role instance to each respective tenant, where the role instance is linked to the role template in the cloud computing system and where the role instance includes a role instance set of rights that includes an intersection of the role template set of rights and the tenant set of rights for the respective tenant.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Role-template-based batch management of tenant-specific roles and rights in a computing system is described. The system enables a provider to build a cloud where each tenant may have different rights and custom, tenant-specific roles which compose these rights in addition to a common set of 'predefined' role instances whose rights are the intersection of the tenant's specific rights and the rights of its associated role template. Hence, the set of rights for a given predefined role instance, and the users to whom these roles are assigned, may vary from tenant to tenant based on the privileges (rights) of each tenant. This system allows tenants' rights, role-template rights, and custom tenant roles to be managed separately. A change to either a tenant's rights or a role template's rights will automatically update the set of rights in the affected role instances. At any point, a tenant administrator may 'unlink' a predefined role instance from its template so that its rights are managed by the tenant administrator, rather than a system/provider administrator. Reciprocally, a tenant may also relink a predefined role instance back to its template to restore the original behavior.

Figure 1:
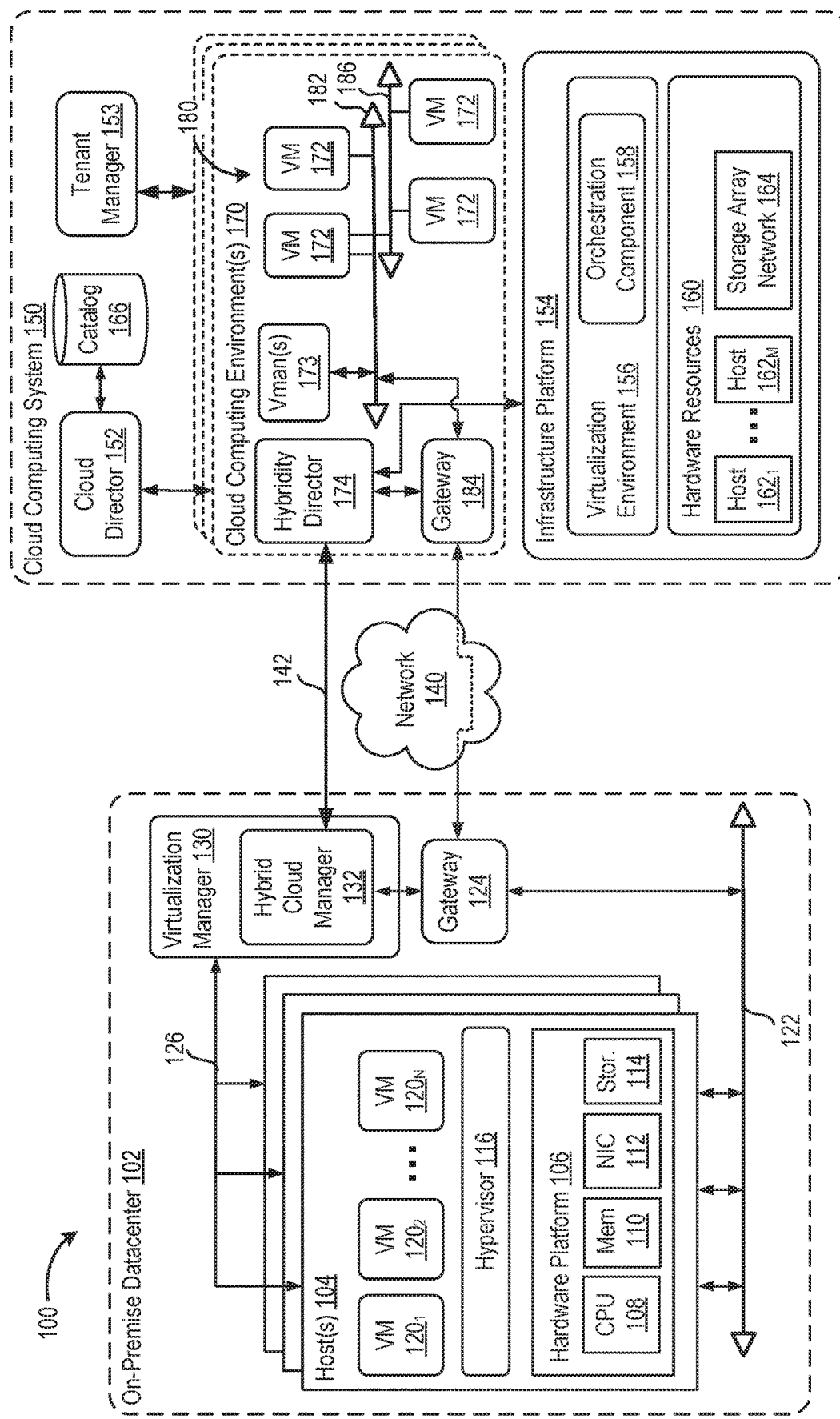
FIG. 1 is a block diagram of a hybrid cloud computing system in which one or more embodiments of the present disclosure may be utilized.

FIG. 1 is a block diagram of a hybrid cloud computing system 100 in which one or more embodiments of the present disclosure may be utilized. Hybrid cloud computing system 100 includes a virtualized computing system implementing an on-premise data center 102 and a virtualized computing system implementing a cloud computing system 150. Hybrid cloud computing system 100 is configured to provide a common platform for managing and executing virtual workloads seamlessly between on-premise data center 102 and cloud computing system 150. In one embodiment, on-premise data center 102 may be a data center controlled and administrated by a particular enterprise or business organization, while cloud computing system 150 may be operated by a cloud computing service provider and exposed as a service available to account holders, such as the particular enterprise in addition to other enterprises. As such, on-premise data center 102 may sometimes be referred to as a "private" cloud, and cloud computing system 150 may be referred to as a "public" cloud. While the example of FIG. 1 includes on-premise data center 102, in some embodiments, on-premise data center 102 can be omitted. Thus, embodiments described herein can be used in a private cloud, public cloud, or hybrid cloud system.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

On-premise data center 102 includes one or more host computer systems ("hosts 104"). Hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within on-premise data center 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104.

On-premise data center 102 includes a virtualization management component (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in on-premise data center 102, or alternatively, running as a VM in one of hosts 104. One example of a virtualization manager is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative tasks, as described in greater detail later. In one implementation, hybrid cloud manager 132 is a module or plug-in complement to virtualization manager 130, although other implementations may be used, such as a separate computer program executing in a central server or running in a VM in one of hosts 104. One example of hybrid cloud manager 132 is the VMware vCloud Connector® product made available from VMware, Inc.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in on-premise data center 102 with connectivity to an external network 140 (e.g., Internet). Gateway 124 may manage external public IP addresses for VMs 120 and route traffic incoming to and outgoing from on-premise data center 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to on-premise data center 102, virtualization environment 156 may be implemented by running on hosts 162 VMware ESXi™-based hypervisor technologies provided by VMware, Inc. (although it should be recognized that any other virtualization technologies, including Xen® and Microsoft Hyper-V® virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates, packaged virtual machine applications, virtual data centers, and the like that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp technology made available by VMware, Inc., although other technologies may be utilized. A virtual data center includes one or more virtual machines that provides a pool of resources. Cloud director 152 receives provisioning requests submitted (e.g., via REST API calls) and may propagates such requests to orchestration component 158 to instantiate the requested virtual machines (e.g., VMs 172). One example of cloud director 152 is the VMware vCloud Director® produced by VMware, Inc.

In the embodiment of FIG. 1, cloud computing environment 170 supports the creation of a virtual data center 180 having a plurality of virtual machines 172 instantiated to, for example, host deployed multi-tier applications, as well as one or more virtualization managers 173 (abbreviated as "Vman(s)"). A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160. Virtualization managers 173 can be configured similarly to virtualization manager 130.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within on-premise data center 102. In other embodiments, gateway 184 may be configured to connect to communicate with on-premise data center 102 using a high-throughput, dedicated link (depicted as a direct connect 142) between on-premise data center 102 and cloud computing system 150. In one or more embodiments, gateways 124 and 184 are configured to provide a "stretched" layer-2 (L2) network that spans on-premise data center 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in on-premise data center 102 to enable a common virtualized computing platform between on-premise data center 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connection 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

Figure 2:
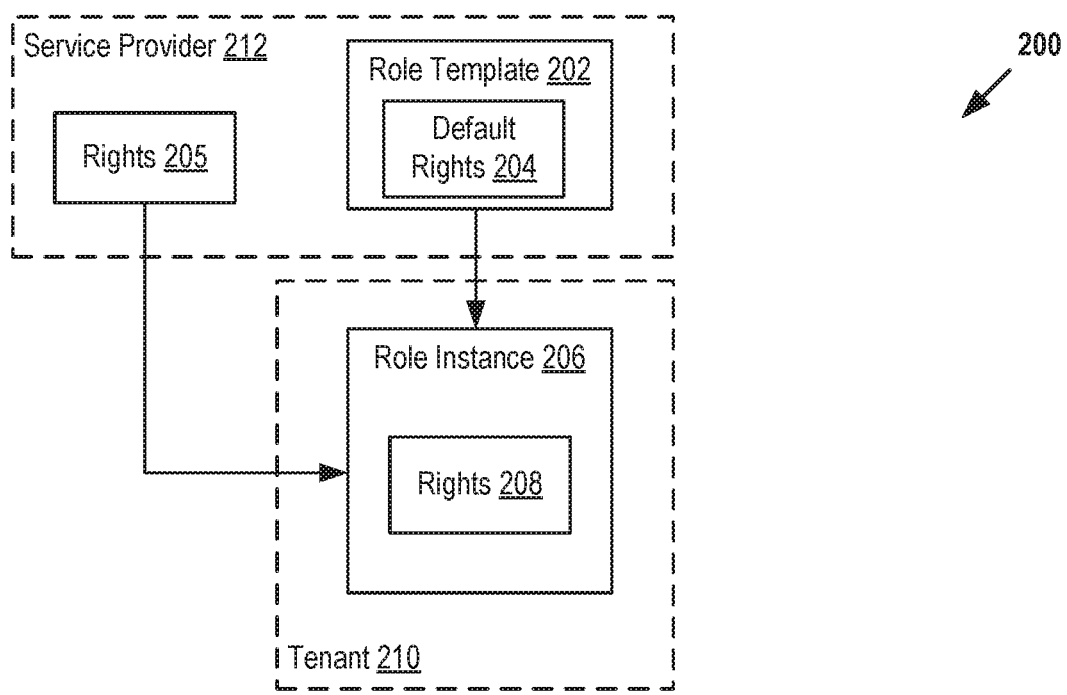
FIG. 2 is a block diagram depicting a relationship between a role templates and instances in a cloud computing system according to an embodiment.
Figure 3:
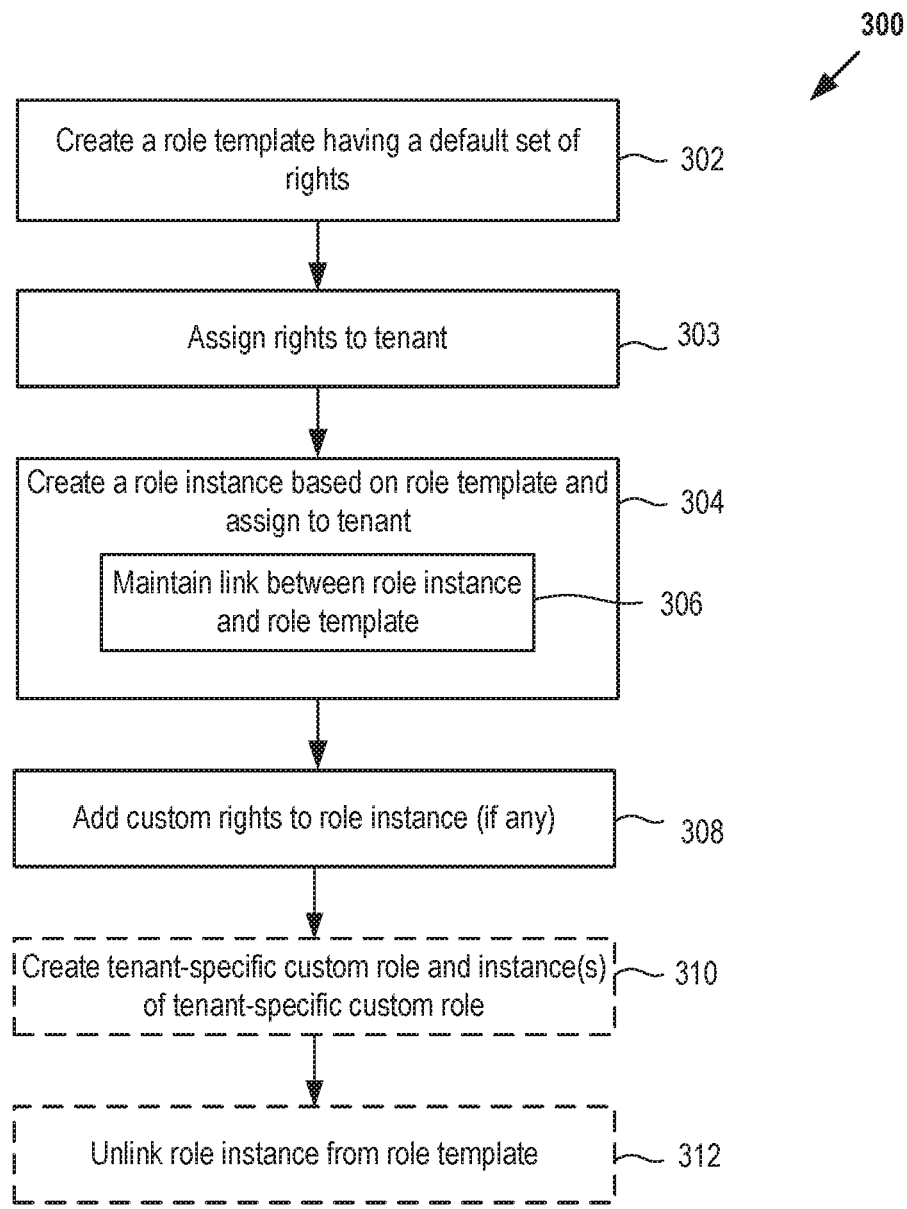
FIG. 3 is a flow diagram depicting a method of managing roles and rights in a cloud computing system according to an embodiment.

In a multi-tenant system managed by a service provider, a user's security context governs what the user is entitled to do within the system. The cloud computing system derives a user's security context from rights associated with role(s) assigned to the user. FIG. 2 is a block diagram depicting a relationship between a role templates and instances in a cloud computing system according to an embodiment. FIG. 3 is a flow diagram depicting a method 300 of managing roles and rights in a cloud computing system according to an embodiment. Method 300 can be performed for multiple tenants concurrently or in sequence.

Method 300 begins at step 302, where a system administrator of a service provider 212 (e.g., a system administrator of cloud computing system 150) creates a role template 202 having a default set of rights (default rights 204 or "role template" set of rights). While a single role template 202 is described as an example, it is to be understood that a service provider can create multiple role templates. A right is authorization to create, modify, or access a resource in cloud computing system 150, such as a device (virtual or physical), software component, function of a software component, or the like. If a user is granted a right, the user can access the resource. Otherwise, the cloud computing system prevents the user from accessing the resource. The system administrator can create role template 202 using a component in cloud computing system 150, such as a tenant manager 153. Tenant manager 153 can be a physical or virtual computing system similar to other computing systems shown in FIG. 1 and described above. The system administrator can create a plurality of role templates 202 for use by various tenants in cloud computing system 150. Each role template 202 includes default rights (rights 204), which can differ from one role template to the next.

At step 303, the system administrator of service provider 212 assigns rights 205 to tenant 210. Rights 205 are the set of rights that tenant 210 from which tenant can select to be assigned to its users (also referred to as a tenant set of rights).

At step 304, the system administrator of service provider 212, or a tenant administrator of tenant 210, creates a role instance 206 based on a role template 202. Cloud computing system 150 maintains a link between role instance 206 and role template 202 (step 306). The administrator can create a plurality of role instances 206, each based on a corresponding role template 202. In an example, when a system administrator of service provider 212 creates a tenant, cloud computing system 150 creates default role instances for the tenant. A role instance 208 includes rights 208 (also referred to as a role instance set of rights). Rights 208 are the intersection of default rights 204 and rights 205. Initially, when role instance 206 is created, rights 208 include all or a portion of default rights 204. Notably, any rights in default rights 204 that are not part of rights 205 (those rights granted to tenant 210), are not part of rights 208 in role instance 206 (since tenant 210 as a whole would not have such rights). If all of default rights 204 are in rights 205 granted to tenant 210, then rights 208 in role instance 206 would include all of default rights 204. When the system administrator updates role template 202 by adding or removing default rights 204, the changes are propagated to all role instances 206 across tenants that are linked to role template 202.

At step 308, a tenant administrator of tenant 210 can add custom rights to role instance 206 if desired. Custom rights are any of rights 205 granted to tenant 210 that are not in the default rights 204. Thus, in some cases, rights 208 in role instance 206 can include more than default rights 204 (e.g., additional rights 205 granted to tenant 210 that are not part of default rights 204). A tenant administrator cannot grant a right 208 in role instance 206 that has not been granted to tenant 210.

When rights are removed from tenant 210 (e.g., some of rights 205 are removed), those removed rights are also removed from any role instances 206 that contain them. When rights are added to tenant 210 (e.g., some rights are added to rights 205), those rights are automatically added to any role instance 206 linked to role templates 202 that contain those rights (as part of default rights 204). Cloud computing system 150 maintains this synchronization of rights over time as rights 205, as well as default rights 204, are adjusted.

In addition to roles based on templates, the system can support tenant-specific custom roles, i.e., roles that are not linked to a role template, but have a set of rights selected from the rights granted to the tenant by the service provider. Thus, in some embodiments, at optional step 310, a tenant administrator of tenant 210 creates a tenant-specific custom role and one or more instances thereof. In general, the tenant administrator can create one or more tenant-specific custom roles. The tenant-specific custom role can include one or more rights that have been assigned to the tenant at step 203.

In some embodiments, at optional step 312, a tenant administrator of tenant 210 can unlink the role instance from the role template to create a tenant-specific role instance. The tenant administrator can then add or subtract rights from the tenant-specific role instance as desired. As discussed further below, the tenant administrator can subsequently re-link the tenant-specific role instance to the role template, at which time its rights are synchronized with the role template.

The techniques described above provide the ability to have fine grained control over the set of rights granted to a tenant and, by extension, to all of its users. The techniques also provide flexibility in providing role instances for a new tenant. Role instances for all new tenants can be based on a set of role templates defined by the system administrator of the service provider. The role instances for a new tenant may be based on role templates specifically selected during the tenant creation process. The techniques provide the ability to separate the concerns of org-rights management and batch role provisioning and management.

Consider a service provider that has a person responsible for tenant security (the tenant-security admin) and another person responsible for managing batch role updates (the role admin). The tenant-security admin may impose security constraints on a tenant by managing its org rights. The role administrator can enable or disable a feature for all eligible tenants by adding or removing a feature-specific right or rights to an existing or new template or templates. The person conducting the role administration does not need to be concerned that any template updates will conflict with any of the tenant security changes.

For example, consider a case where a service provider wants to unlock some networking feature for a group of tenants who have paid for the network feature. The tenant-security admin would grant the related rights to the group of tenants. The role administrator could update the "Organization Administrator" template to include the rights. This update would push the networking rights to linked "Organization Administrator" role instances in those organizations that have been granted the networking rights. Hence, users with the "Organization Administrator" role within these organizations would be authorized for the new networking features.

The order in which the administrators make their changes does not matter. If the order in which the tenant-security admin and the role-admin did their work was reversed, i.e., the networking rights were added to the role template before the rights were granted to the target organizations, the net effect would still be the same because the system would synchronize the role instances in the target organizations such that they would include the networking rights.

If the tenant-security administrator decided to remove the networking rights from one of the tenant organizations, the system would automatically remove the rights from its instance of "Organization Administrator" role.

From an organization administrator's perspective, role instances are owned and can be entirely managed by the organization administrator. Tenants do not share role instances. An organization administrator can adopt a hands-off approach where he or she creates no new roles and lets the predefined role instances in the organization receive updates from system-admin initiated template changes. Alternatively, the admin can exercise full control over the organization roles by creating new, custom roles and "unlinking" and customizing some or all of the predefined role instances. These custom role instances would not have their rights synchronized, since they are unlinked from any role template.

Figure 4:
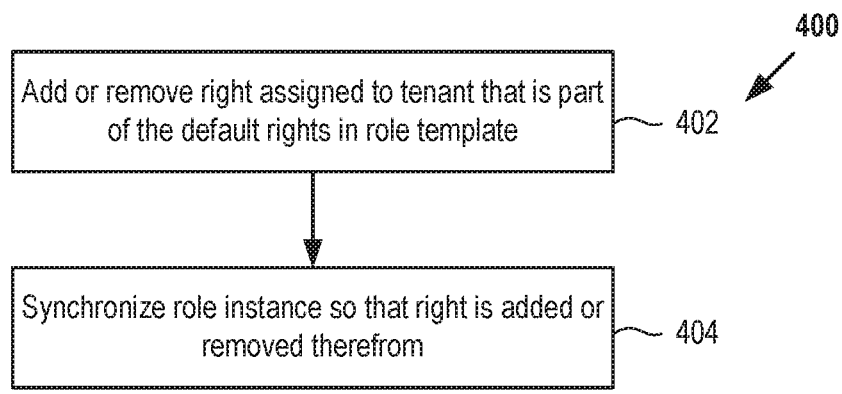
FIG. 4 is a flow diagram depicting a method of synchronizing rights in a role instance according to an embodiment.

FIG. 4 is a flow diagram depicting a method 400 of synchronizing rights in a role instance according to an embodiment. Method 400 begins at step 402, where a system administrator of service provider 212 adds or removes a right from rights 205 assigned to tenant 210. At step 404, cloud computing system 150 (e.g., tenant manager 153) synchronizes role instance 206 so that the right is added or removed from rights 208.

Figure 5:
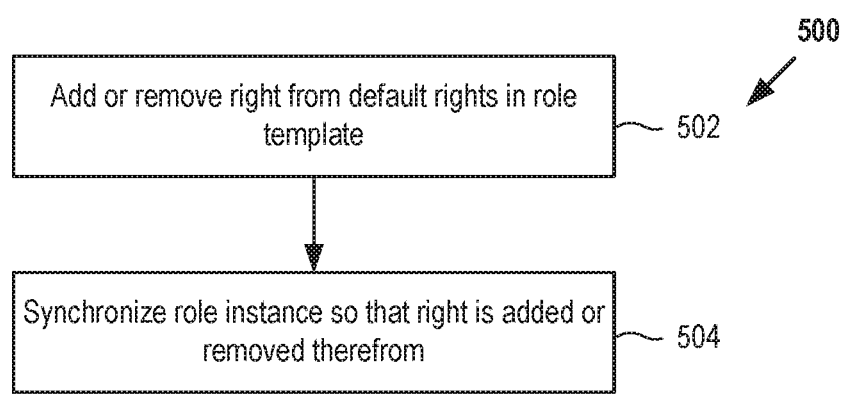
FIG. 5 is a flow diagram depicting a method of synchronizing rights in a role instance according to another embodiment.

FIG. 5 is a flow diagram depicting a method 500 of synchronizing rights in a role instance according to another embodiment. Method 500 begins at step 502, where a system administrator of service provider 212 adds or removes a right from default rights 204. At step 504, cloud computing system 150 (e.g., tenant manager 153) synchronizes role instance 206 so that the right is added or removed from rights 208.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization.

The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of managing rights in a cloud computing system, comprising:
   creating a role template having a role template set of rights to resources in the cloud computing system;
   assigning a tenant set of rights to the resources to each of a plurality of tenants of the cloud computing system, respectively; and
   creating a role instance for each respective tenant of the plurality of tenants based on the role template and assigning the role instance to each respective tenant of the plurality of tenants, wherein:
      the role instance is linked to the role template in the cloud computing system;
      the role instance includes a role instance set of rights that is an intersection of the role template set of rights and the tenant set of rights for the respective tenant; and
      the role instance set of rights does not include one or more rights that are in the role template set of rights and not in the tenant set of rights for the respective tenant.

2. The method of claim 1, further comprising:
   adding custom rights to the role instance set of rights for a first tenant of the plurality of tenants, the custom rights selected from the tenant set of rights for the first tenant and not included in the role template set of rights.

3. The method of claim 1, further comprising:
   adding a new right to the tenant set of rights of a first tenant of the plurality of tenants, where the new right is part of the role template set of rights; and
   synchronizing the role instance for the first tenant such that the new right is added to the role instance set of rights for the first tenant.

4. The method of claim 1, further comprising:
   removing a selected right from the tenant set of rights of a first tenant of the plurality of tenants, where the selected right is part of the role instance set of rights for the first tenant; and
   synchronizing the role instance of the first tenant such that the selected right is removed from the role instance set of rights for the first tenant.

5. The method of claim 1, further comprising:
   adding a new right to the role template set of rights, where the new right is part of the tenant set of rights for a first tenant of the plurality of tenants; and
   synchronizing the role instance of the first tenant such that the new right is added to the role instance set of rights for the first tenant.

6. The method of claim 1, further comprising:
   removing a selected right from the role template set of rights; and
   synchronizing the role instance of a first tenant of the plurality of tenants such that the selected right is removed from the role instance set of rights of the first tenant.

7. The method of claim 1, wherein each right in the role template set of rights for each tenant of the plurality of tenants, the tenant set of rights for each tenant of the plurality of tenants, and the role instance set of rights for each tenant of the plurality of tenants is permission to access a resource in the cloud computing system.

8. A non-transitory computer readable medium having stored thereon instructions, which when executed on a computer, cause the computer to perform a method of managing rights in a cloud computing system, comprising:
   creating a role template having a role template set of rights to resources in the cloud computing system;
   assigning a tenant set of rights to the resources to each of a plurality of tenants of the cloud computing system, respectively; and
   creating a role instance for each respective tenant of the plurality of tenants based on the role template and assigning the role instance to each respective tenant of the plurality of tenants, wherein:
      the role instance is linked to the role template in the cloud computing system;
      the role instance includes a role instance set of rights that is an intersection of the role template set of rights and the tenant set of rights for the respective tenant; and
      the role instance set of rights does not include one or more rights that are in the role template set of rights and not in the tenant set of rights for the respective tenant.

9. The non-transitory computer readable medium of claim 8, wherein the method further comprises:
   adding custom rights to the role instance set of rights for a first tenant of the plurality of tenants, the custom rights selected from the tenant set of rights for the first tenant and not included in the role template set of rights.

10. The non-transitory computer readable medium of claim 8, wherein the method further comprises:
    adding a new right to the tenant set of rights for a first tenant of the plurality of tenants, where the new right is part of the role template set of rights; and
    synchronizing the role instance for the first tenant such that the new right is added to the role instance set of rights for the first tenant.

11. The non-transitory computer readable medium of claim 8, wherein the method further comprises:
    removing a selected right from the tenant set of rights for a first tenant of the plurality of tenants, where the selected right is part of the role instance set of rights for the first tenant; and
    synchronizing the role instance for the first tenant such that the selected right is removed from the role instance set of rights for the first tenant.

12. The non-transitory computer readable medium of claim 8, wherein the method further comprises:
    adding a new right to the role template set of rights, where the new right is part of the tenant set of rights for a tenant of the plurality of tenants; and synchronizing the role instance such that the new right is added to the role instance set of rights for the first tenant.

13. The non-transitory computer readable medium of claim 8, wherein the method further comprises:
removing a selected right from the role template set of rights; and
synchronizing the role instance for a first tenant of the plurality of tenants such that the selected right is removed from the role instance set of rights for the first tenant.

14. The non-transitory computer readable medium of claim 8, wherein each right in the role template set of rights for each tenant of the plurality of tenants, the tenant set of rights for each tenant of the plurality of tenants, and the role instance set of rights for each tenant of the plurality of tenants is permission to access a resource in the cloud computing system.

15. A computer system in a cloud computing system, comprising:
a hardware platform having a central processing unit (CPU) and a memory; and
a software platform having code stored in the memory and configured for execution by the CPU to:
create a role template having a role template set of rights to resources in the cloud computing system;
assign a tenant set of rights to the resources to each of a plurality of tenants of the cloud computing system, respectively; and
create a role instance for each respective tenant of the plurality of tenants based on the role template and assigning the role instance to each respective tenant of the plurality of tenants, wherein:
the role instance is linked to the role template in the cloud computing system;
the role instance includes a role instance set of rights that is an intersection of the role template set of rights and the tenant set of rights for the respective tenant; and
the role instance set of rights does not include one or more rights that are in the role template set of rights and not in the tenant set of rights for the respective tenant.

16. The computing system of claim 15, wherein the code is configured for execution by the CPU to:
add custom rights to the role instance set of rights for a first tenant of the plurality tenants, the custom rights selected from the tenant set of rights for the first tenant and not included in the role template set of rights.

17. The computing system of claim 15, wherein the code is configured for execution by the CPU to:
add a new right to the tenant set of rights for a first tenant of the plurality of tenants, where the new right is part of the role template set of rights; and
synchronize the role instance for the first tenant such that the new right is added to the role instance set of rights for the first tenant.

18. The computing system of claim 15, wherein the code is configured for execution by the CPU to:
remove a selected right from the tenant set of rights for a first tenant of the plurality of tenants, where the selected right is part of the role instance set of rights for the first tenant; and
synchronize the role instance for the first tenant such that the selected right is removed from the role instance set of rights for the first tenant.

19. The computing system of claim 15, wherein the code is configured for execution by the CPU to:
add a new right to the role template set of rights, where the new right is part of the tenant set of rights for a first tenant of the plurality of tenants; and
synchronize the role instance for the first tenant such that the new right is added to the role instance set of rights for the first tenant.

20. The computing system of claim 15, wherein the code is configured for execution by the CPU to:
remove a selected right from the role template set of rights; and
synchronize the role instance for a first tenant of the plurality of tenants such that the selected right is removed from the role instance set of rights for the first tenant.

* * * * *